(12) United States Patent
Arai et al.

(10) Patent No.: US 9,964,424 B2
(45) Date of Patent: May 8, 2018

(54) FLOW SENSOR AND MANUFACTURING METHOD THEREOF

(71) Applicant: Hitachi Automotive Systems, Ltd., Hitachinaka-shi, Ibaraki (JP)

(72) Inventors: Satoshi Arai, Tokyo (JP); Shigeharu Tsunoda, Tokyo (JP); Shinobu Tashiro, Tokyo (JP); Takeshi Morino, Tokyo (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 105 days.

(21) Appl. No.: 14/771,093

(22) PCT Filed: Jan. 27, 2014

(86) PCT No.: PCT/JP2014/051715
§ 371 (c)(1),
(2) Date: Aug. 27, 2015

(87) PCT Pub. No.: WO2014/156268
PCT Pub. Date: Oct. 2, 2014

(65) Prior Publication Data
US 2016/0011029 A1 Jan. 14, 2016

(30) Foreign Application Priority Data

Mar. 25, 2013 (JP) ................................. 2013-061681

(51) Int. Cl.
*G01F 1/684* (2006.01)
*B29C 65/16* (2006.01)
*B23K 33/00* (2006.01)
*B29C 65/00* (2006.01)
(Continued)

(52) U.S. Cl.
CPC .......... *G01F 1/6842* (2013.01); *B23K 26/324* (2013.01); *B23K 33/004* (2013.01);
(Continued)

(58) Field of Classification Search
CPC .................................................... G01F 1/6842
(Continued)

(56) References Cited

U.S. PATENT DOCUMENTS

2005/0077656 A1* 4/2005 Watanabe .......... B23K 26/0648
264/482
2005/0173055 A1 8/2005 Okuda
(Continued)

FOREIGN PATENT DOCUMENTS

JP 11-258019 A 9/1999
JP 2005-219449 A 8/2005
(Continued)

OTHER PUBLICATIONS

International Search Report (PCT/ISA/210) dated Apr. 28, 2014 with English translation (five pages).

*Primary Examiner* — Walter L Lindsay, Jr.
*Assistant Examiner* — Philip Marcus T Fadul
(74) *Attorney, Agent, or Firm* — Crowell & Moring LLP

(57) ABSTRACT

Provided are a laser-welded structure and a laser welding method for a cover and a housing ensuring high reliability and suppressing changes in characteristics due to burrs protruding into a subpassage of the flow sensor. To this end, this flow sensor is provided with a housing, a cover, a circuit chamber sealed between these and housing electronic components or wiring, and a subpassage through which the fluid flows that is to be sensed, and is characterized in that there are projections provided on both ends of the joining section of the cover where the housing and the cover are laser-welded, and the height of the projection on the subpassage side is greater than the height of the projection on the side opposite of the subpassage.

12 Claims, 11 Drawing Sheets

(51) Int. Cl.
*B23K 26/324* (2014.01)
*B29L 31/34* (2006.01)
*B23K 103/00* (2006.01)

(52) U.S. Cl.
CPC ...... *B29C 65/1635* (2013.01); *B29C 65/1677* (2013.01); *B29C 66/12449* (2013.01); *B29C 66/12469* (2013.01); *B29C 66/242* (2013.01); *B29C 66/244* (2013.01); *B29C 66/326* (2013.01); *B29C 66/3242* (2013.01); *B29C 66/53462* (2013.01); *B29C 66/7392* (2013.01); *B29C 66/81267* (2013.01); *B23K 2203/30* (2015.10); *B29C 65/1612* (2013.01); *B29C 65/1654* (2013.01); *B29C 66/71* (2013.01); *B29C 66/7212* (2013.01); *B29C 66/73776* (2013.01); *B29C 66/73921* (2013.01); *B29L 2031/3481* (2013.01)

(58) Field of Classification Search
USPC .......................................................... 73/273
See application file for complete search history.

(56) References Cited

U.S. PATENT DOCUMENTS

| | | | |
|---|---|---|---|
| 2008/0254242 | A1 | 10/2008 | Asada et al. |
| 2011/0296904 | A1 | 12/2011 | Tagawa et al. |
| 2012/0135300 | A1* | 5/2012 | Ota ............... H01M 2/1061 |
| | | | 429/176 |
| 2012/0183778 | A1* | 7/2012 | Farrell ............ C08L 67/02 |
| | | | 428/412 |

FOREIGN PATENT DOCUMENTS

| | | |
|---|---|---|
| JP | 2007-210165 A | 8/2007 |
| JP | 2007-210203 A | 8/2007 |
| JP | 2008-32539 A | 2/2008 |
| JP | 2008-260161 A | 10/2008 |
| JP | 2010-162587 A | 7/2010 |
| JP | 2010-221572 A | 10/2010 |
| JP | 2011-252796 A | 12/2011 |

* cited by examiner

FIG. 2A
FIG. 2B
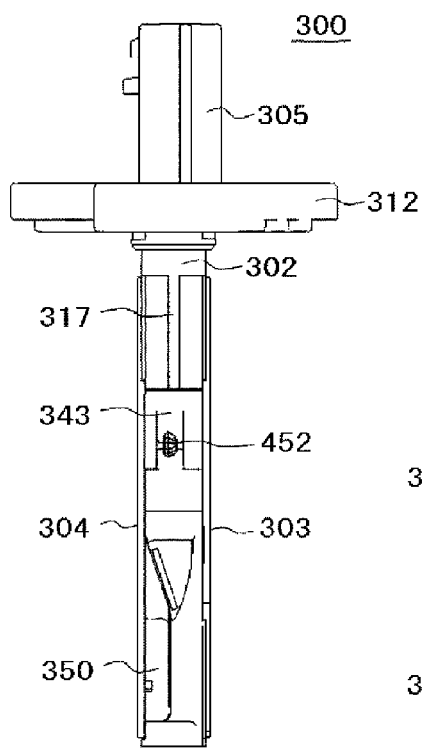
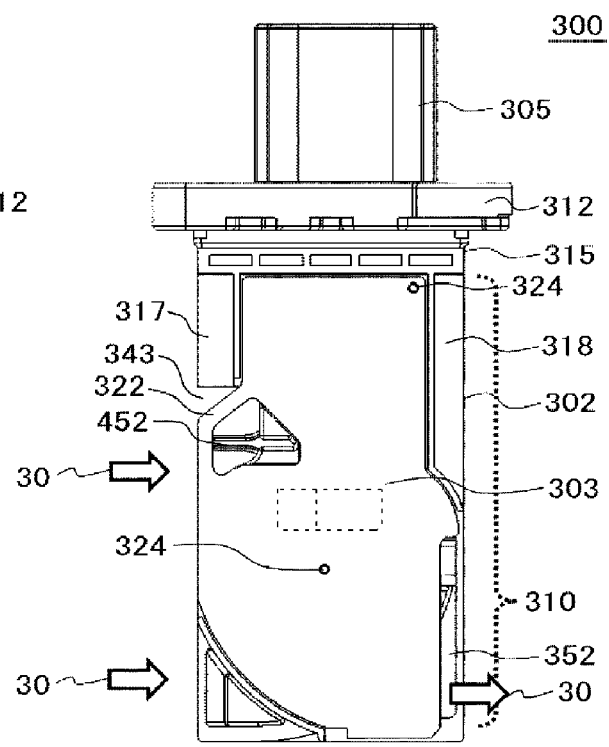

FIG. 3A
FIG. 3B
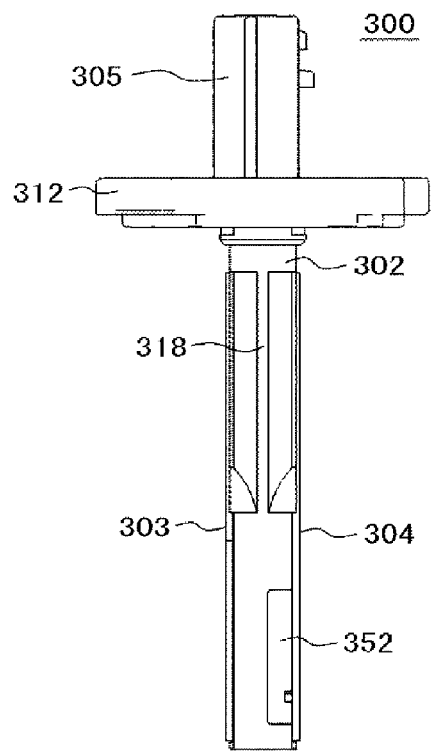
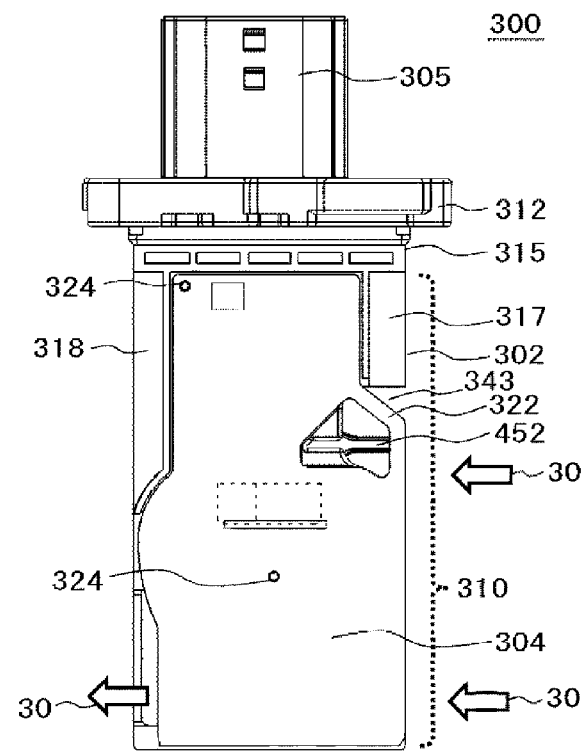

A-B SECTION

FIG. 7C
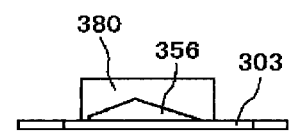
FIG. 7A　　　　FIG. 7B
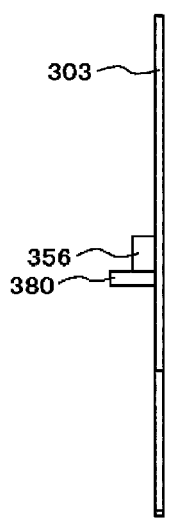 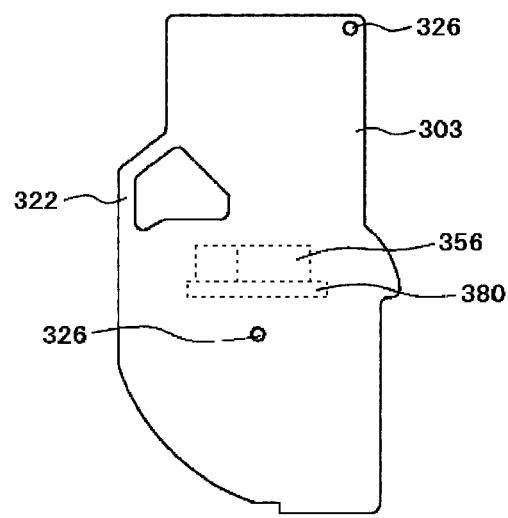

FIG. 8C
FIG. 8A    FIG. 8B
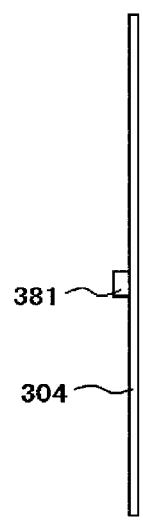
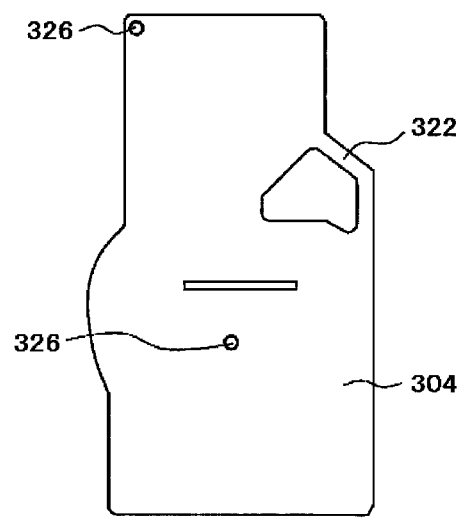

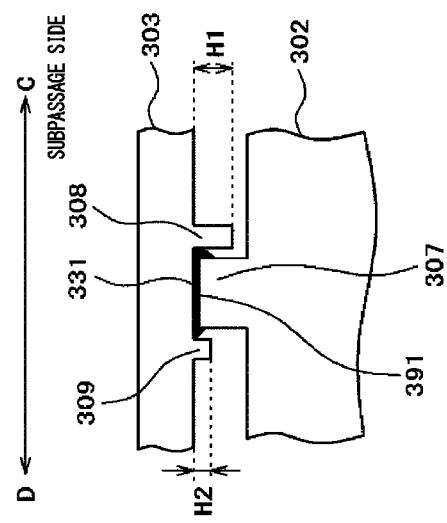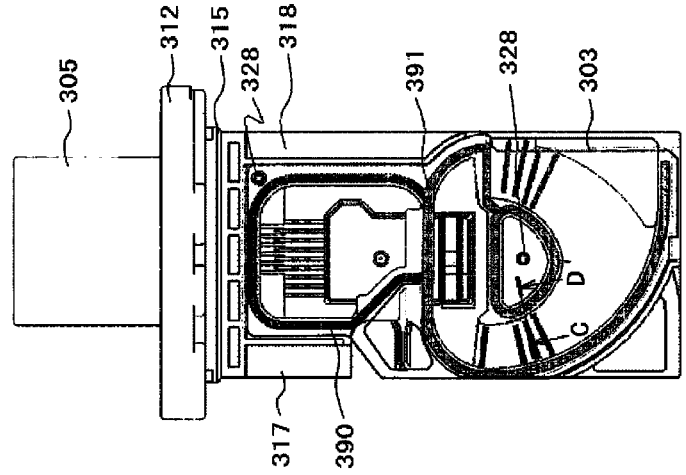

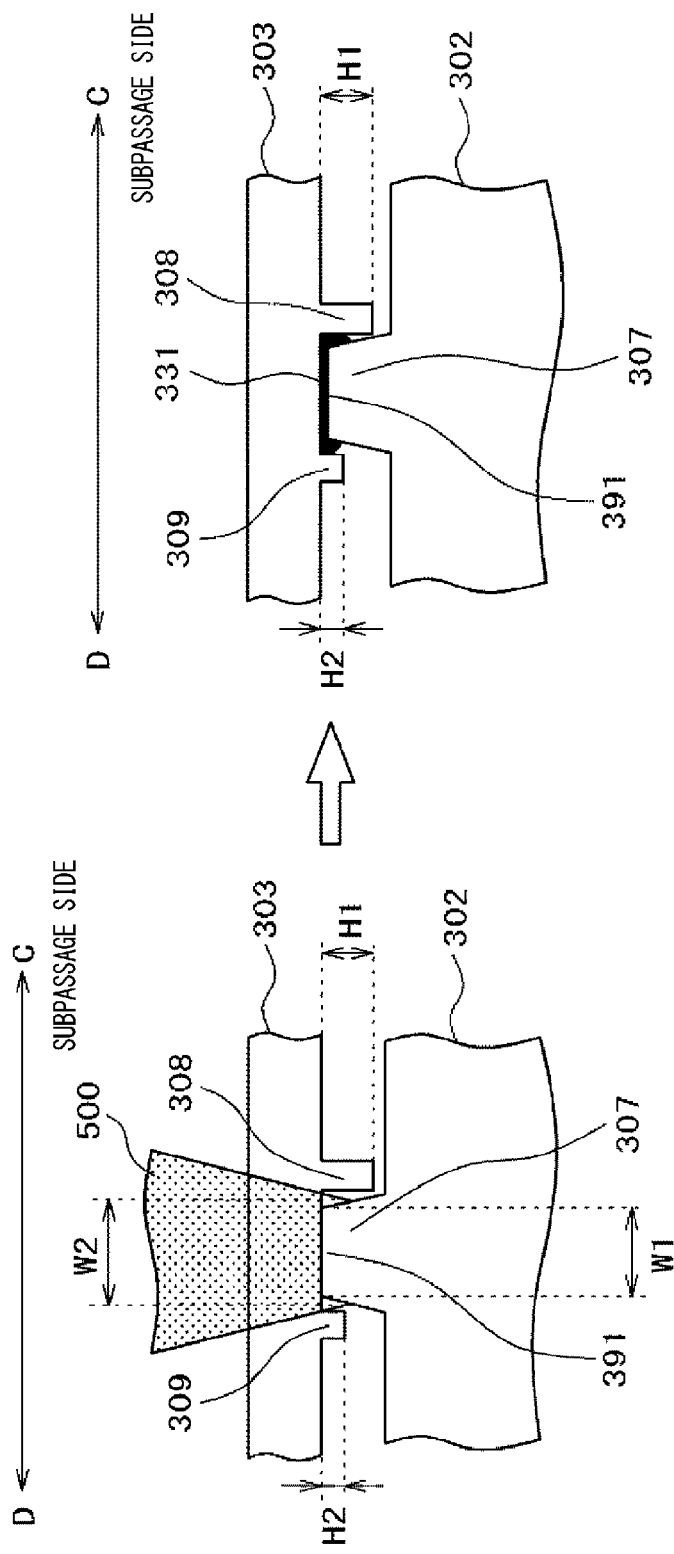

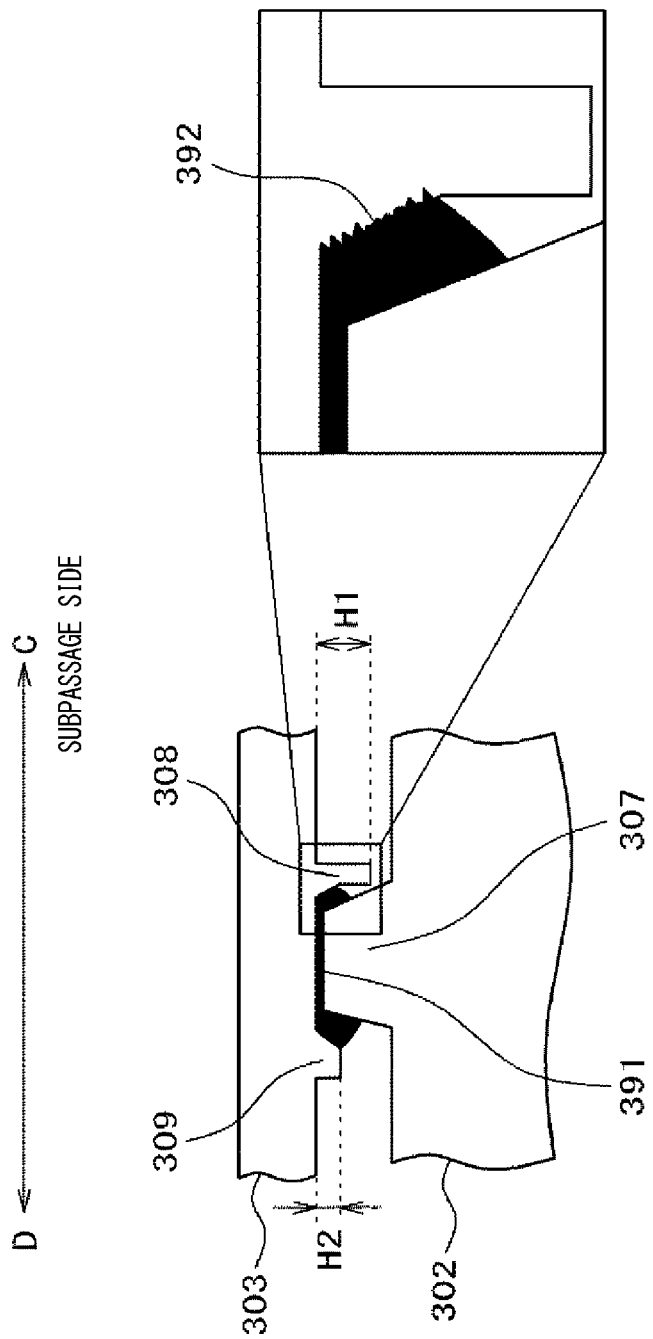

FLOW SENSOR AND MANUFACTURING METHOD THEREOF

TECHNICAL FIELD

The present invention relates to a flow sensor and the manufacturing method thereof and further relates to the laser-welded structure between plastic members and the same method.

BACKGROUND ART

The thermal flow sensor which measures the flow rate of a gas includes a flow rate detection section to measure a flow rate and is arranged such that the flow rate of the gas is measured through the thermal transmission being conducted between the flow rate detection section and the gas which is an object to be measured. The flow rates measured by the thermal flow sensor are widely put to use as the parameters important to control various types of devices. The characteristic feature of the thermal flow sensor lies in that it can measure the flow rate of a gas with relatively higher precision than the other flow sensors operated according to different methods, but in recent years it is hoped that the precision with which the flow rate of a gas is measured is further enhanced. For instance, with a vehicle in which an internal combustion engine is incorporated, further enhancement of fuel saving and exhausted gas purification is on high demand. In order to respond to such demand, it is required that the intake air volume which is a principal parameter of the internal combustion engine be measured with enhanced precision. The thermal flow sensor which measures the volume of an intake air guided into the internal combustion engine includes an auxiliary channel to take in a portion of the intake air volume and a flow rate detection section disposed in the auxiliary channel, in which the flow rate detection section measures the state of a gas to be measured which flows through the auxiliary channel through the thermal transmission being conducted between the flow rate detection section and the gas to be measured and outputs an electric signal defining the volume of an intake air guided into the internal combustion engine. The above-mentioned thermal flow sensor is disclosed in Japanese Patent Application Laid-Open Publication No. 2011-252796 (PTL 1), by way of one example.

Further, regarding such measuring instruments as the above-mentioned thermal flow sensor, it is disclosed in Japanese Patent Application Laid-Open No. HEI 11 (1999)-258019 (PLT 2), by way of one example that in order to prevent the base and the cover bonded through an adhesive and as such on the housing to receive a measuring device therein from being peeled off from the housing owing to the deterioration of adhesive strength and from being dropped into the main channel, they are fused to the housing with the provision of the drop-off prevention projection and the drop-off prevention groove. Further, the laser-welding technique in which the housing and the cover are laser-welded to each other is disclosed in Japanese Patent Application Laid-Open No. 2007-210165 (PTL 3), by way of one example. Moreover, in Japanese Patent Unexamined Application Publication No. 2008-260161 (PTL 4), there is disclosure that in order to restrain burrs generated when the laser-welding is performed from being dropped off, a closure space in which such burrs are received is formed. Furthermore, in Japanese Patent Application Laid-Open No. 2010-221572 (PTL 5), there is disclosure on the technique by which the fused resin is not oozed out of the main body through a groove being provided on each end of a transmissive resin where a laser beam is irradiated.

CITATION LIST

Patent Literature

PTL 1: Japanese Patent Application Laid-Open No. 2011-252796
PTL 2: Japanese Patent Application Laid-Open No. HEI 11 (1999)-258019
PTL 3: Japanese Patent Application Laid-Open No. 2007-210165
PTL 4: Japanese Patent Application Laid-Open No. 2008-260161
PTL 5: Japanese Patent Application Laid-Open No. 2010-221572

SUMMARY OF INVENTION

Technical Problem

The flow sensor includes a flow rate detection section and a temperature detection section, which sections are disposed on the housing (casing). Further, within the circuit chamber of the housing, various types of electronic parts are packaged, so that it is required that the circuit chamber be sealed so as to prevent wirings from being short-circuited or corroded. Thus, conventionally, for the purpose of sealing the circuit chamber, the method of sealing and fixing the housing and the cover by use of a plurality of adhesives is applied. For such adhesives, there are known a lot of curable types, but in view of the reliability with which the flow sensor is used for automobiles and as such, thermally curable types of adhesives are often adopted. However, when such thermally curable adhesives are adopted, it requires more than ten minutes until such adhesives are cured, so that the setback with such curable adhesives mostly lies in the fact that productivity deteriorates. Another problem with them lies in the fact that the production cost becomes bulky because the flow sensor requires a lot amount of adhesives for sealing the housing and the cover. Further, the extra space is required for controlling the ooze-out of the adhesives, so that the latitude with which the flow sensor is designed is limited. On top of that, there is difficulty with quantitatively controlling the fill-in of the adhesives which is regarded as proper to seal such electronic parts. To address the afore-mentioned problems, the laser welding method is exemplified which allows the cover and the housing to be directly bonded with precision without doing damage on such electronic parts. In the above-mentioned PTL 2 and 3, in which sensors and as such are exemplified, there is disclosure that the fused region is made uniform to secure air-tightness, but only adopting the structure and method disclosed in them is faced with difficulty when a high quality is secured for the flow sensor according to the present invention. Moreover, adopting the arrangements disclosed in the above-mentioned PTL 4 and 5 allows burrs to be received in the closure space, but the presence of such closure space requires an extra space in the same way as that for controlling the ooze-out of the adhesives, so that the latitude with which the flow sensor is designed is limited. Furthermore, as for burrs, there is only disclosure therein that they are received in the closure space, but there is no disclosure therein on the advantageous effects brought by the controlled amount of burrs and the reliability of the bonding sections enhanced by such burrs.

Thus, the present invention is to provide a laser welding structure and the same method for the cover and the housing of the flow sensor allowing the large protrusion of burrs to the auxiliary channel section of the flow sensor to be restrained so as to firstly stabilize the characteristics of the flow rate measuring precision and then the reliability with the bonding sections to be secured.

Solution to Problem

In order to solve the above-mentioned problems, by way of some examples, the arrangements recited in the scope of accompanying patent claims are adopted. The present application encompasses a plurality of means to solve the above-mentioned problems, some of which are exemplified as follows.

The flow sensor, which includes a housing to receive an auxiliary channel having an opening through which a fluid to be measured is taken in; a flow rate detection section disposed within the auxiliary channel to measure a flow rate of the fluid to be measured; electronic parts isolated from the auxiliary channel to drive the flow rate detection section within a circuit chamber; and a resinous cover bonded to the housing to air-tightly seal the circuit chamber from a surrounding atmosphere, is arranged such that the flow rate detection section provided on a tip end of a circuit package is protruded into the auxiliary channel so as to be received therein; a protrusion section which is formed on the housing to constitute the auxiliary channel with the cover therebetween and a bonding section formed on an inner surface of the cover are laser welded to each other; a protrusion is formed on each end of the bonding section of the cover; and a height of the protrusion on the side of the auxiliary channel is made higher than that of the protrusion on an opposite side to the auxiliary channel.

Further, the manufacturing method of a flow sensor includes the steps of forming a first protrusion section to seal a circuit chamber through a resinous cover and a second protrusion section for connection to constitute an auxiliary channel with the resinous cover therebetween in a housing in which an auxiliary channel groove provided with an opening through which a fluid to be measured is taken in is formed and which receives a flow rate detection section disposed within the auxiliary channel to measure a flow rate of the fluid to be measured and electronic parts isolated from the auxiliary channel to drive the flow rate detection section in the circuit chamber; forming on the resinous cover bonding sections to be bonded to the first and second protrusion sections formed on the housing as well as forming a third protrusion section on each end of the bonding section to be bonded to the second protrusion section, in which the third protrusion section is formed such that a height of a protrusion formed on a side of the auxiliary channel is made higher than that of a protrusion formed on an opposite side to the auxiliary channel; overlapping the housing in which the respective electronic parts are received and the cover over one another with aligned in position; pressure is applied to the overlapped housing and cover; irradiating a laser beam onto the cover so as to firstly make an interval between the first protrusion section and the corresponding bonding section laser-welded and then to make an interval between the second protrusion section and the corresponding bonding section laser-welded, thereby the cover being bonded to the housing.

Advantageous Effects of Invention

Through the adoption of the present invention, it restrains the flow rate measuring precision characteristics of the flow sensor from deterioration, which is caused by the large protrusion of burrs to the auxiliary channel of such sensor, and allows the laser welding structure for the cover and the housing to secure the enhanced reliability with the bonding sections to be provided. Further, in comparison with the case where adhesives are adopted for bonding the cover with the housing, a flow sensor whose reliability, characteristic stability and cost reduction are further enhanced is provided herein.

BRIEF DESCRIPTION OF DRAWINGS

FIG. 2 shows outer looks of the flow sensor, in which FIG. 2 (A) is a left-hand side view while FIG. 2 (B) is a frontal view thereof.

FIG. 3 shows outer looks of the flow sensor, in which FIG. 3 (A) is a right-hand side view while FIG. 3 (B) is a backside view thereof.

FIG. 7 shows the outer looks of the front cover, in which FIG. 7 (A) is a left-hand side view while FIG. 7 (B) is a frontal view and FIG. 7 (C) is a plan view thereof.

FIG. 8 shows the outer looks of the rear cover 304, in which FIG. 8 (A) is a left-hand side view while FIG. 8 (B) is a frontal view and FIG. 8 (C) is a plan view thereof.

FIG. 9 shows views illustrating the structure by which the front cover is laser welded to the housing, in which FIG. 9 (A) is a top view of the welded section while FIG. 9 (B) is a cross-sectional view of the welded section at the auxiliary channel.

FIGS. 10(A) and 10(B) are cross-sectional views to explain the laser welding method and structure at the auxiliary channel section for the front cover and the housing.

FIG. 13 is a cross-sectional view showing a modified example to explain the laser welding structure at the auxiliary channel section for the front cover and the housing.

DESCRIPTION OF EMBODIMENTS

The mode for carrying out the present invention to be explained hereinafter solves various types of problems hoped to be solved in the aspect of an actual product, in which various types of problems especially with the measuring instrument used to measure the intake air volume of a vehicle are favorably solved and various advantageous effects are brought accordingly. Any one of such various types of problems solved by the following examples corresponds to what is described in the section of the technical problem as described above. Further, any one of the advantageous effects brought by the following examples corresponds to those described in the section of the advantageous effects of invention as described above. As for the other various types of problems solved by the following examples and the other various advantageous effects brought accordingly, they are explained in details in the following examples as such detailed explanations are necessary to elaborate further on the solution to problem as described above.

In the following examples, the same reference signs indicate the same structural components irrespectively of Figure numbers so that such components bring the same operational effect. As with the structural components once explained, there are some cases where their explanations are omitted with only their reference signs indicated in the applicable drawings.

Example 1

Figure 1:
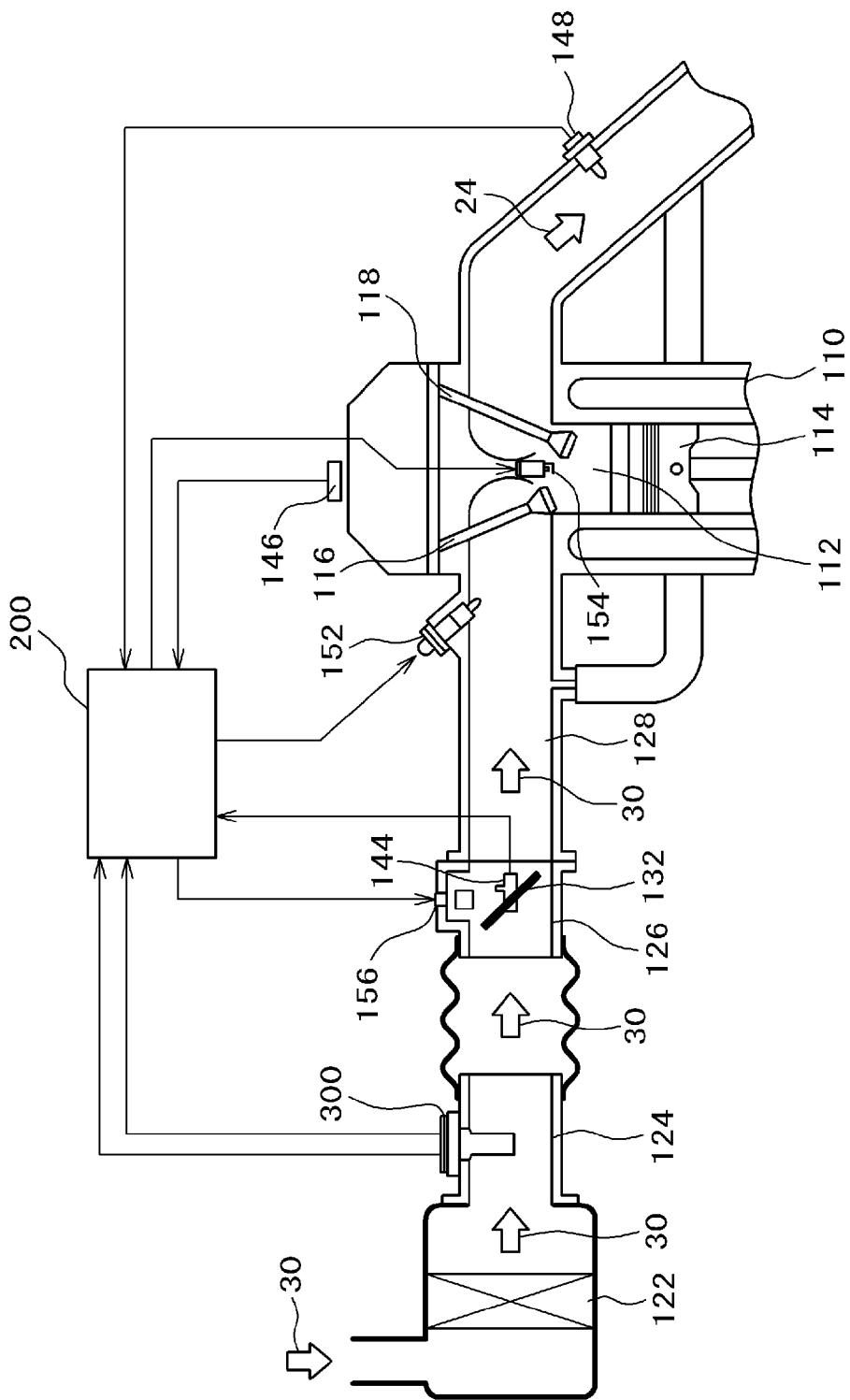
FIG. 1 is a system diagram showing an example when the flow sensor according to the present invention is adopted for an internal combustion engine control system.

1. An Example in which a Flow Sensor according to the Present Invention is Adopted for an Internal Combustion Engine Control System FIG. 1 is a system diagram showing an example in which the flow sensor according to the present invention is adopted for the internal combustion engine control system under the electronic fuel injection system. With reference to the diagram, an intake air is taken in from an air cleaner 122 as a gas to be measured 30 based on the operation of an internal combustion engine 110 provided with an engine cylinder 112 and an engine piston 114 and is guided into a combustion chamber of the engine cylinder 112 through e.g. an intake body, a throttle body 126 and an intake manifold 128 constituting a main channel 124. The flow rate of the gas to be measured 30 corresponding to the intake air which is guided into the combustion chamber is measured by a thermal flow sensor 300 according to the present invention, based on which measured flow rate a fuel is fed from a fuel injection valve 152, which fed fuel is guided into the combustion chamber along with the gas to be measured 30 corresponding to the intake air in the state of a mixing gas. To note, according to the present example, the fuel injection valve 152 is provided on an intake port of the internal combustion engine and the fuel injected to the intake port forms a mixing gas along with the gas to be measured 30 corresponding to the intake air, which mixing gas is guided through an intake valve 116 into the combustion chamber so as to be combusted, thereby mechanical energy being generated.

In recent years, in order to enhance the purification of an exhaust gas and the reduction of fuel consumption for most of the cars to be produced, such a system is adopted as a fuel injection valve 152 being attached onto the cylinder head of the internal combustion engine and a fuel being directly injected to the respective combustion chambers from the fuel injection valve 152. The thermal flow sensor 300 according to the present invention is adoptable not only for the system in which a fuel is injected to the intake port of the internal combustion engine shown in FIG. 1, but also for the system in which a fuel is directly injected to the respective combustion chambers. The fundamental concepts for the measuring method of control parameters including how to use the thermal flow sensor 300 and those for the controlling method of the internal combustion engine including a fuel supply rate and an ignition timing are substantially in common between both systems, among which systems the system in which a fuel is injected to the intake port is representatively shown in FIG. 1.

The fuel and air guided into the combustion chamber presents a mixing state between the fuel and the air, which mixing gas is explosively combusted through the spark ignition of an ignition plug 154, thereby mechanical energy being generated. The combusted gas is guided from an exhaust valve 118 to an exhaust tube and is discharged as an exhaust gas 24 outside the car from the exhaust tube. The flow rate of the gas to be measured 30 corresponding to the intake air which is guided into the combustion chamber is controlled by a throttle valve 132 whose opening changes according to the operation of an acceleration pedal. A fuel supply rate is controlled based on the flow rate of the intake air guided into the combustion chamber. The car driver can control mechanical energy generated by the internal combustion engine by controlling the opening of the throttle valve 132 so as to control the flow rate of the intake air guided into the combustion chamber.

The flow rate and temperature of the gas to be measured 30 corresponding to the intake air taken in from the air cleaner 122 and flowing through the main channel 124 are measured by the thermal flow sensor 300, and electric signals defining the flow rate and temperature of the intake air are inputted from the thermal flow sensor 300 to a control device 200. An output of a throttle angle sensor 144 to measure the opening of the throttle valve 132 is inputted to the control device 200, and the output of a rotational angle sensor 146 is inputted to the control device 200 in order to measure the positions and the states of the engine piston 114, the intake valve 116 and the exhaust valve 118 of the internal combustion engine as well as the rotational speed of the internal combustion engine. The output of an oxygen sensor 148 is inputted to the control device 200 in order to measure the state of a mixing ratio between a fuel rate and an air rate based on the state of the exhaust gas 24.

The control device 200 calculates a fuel injection rate and an ignition timing based on the rotational speed of the internal combustion engine measured based on the flow rate of the intake air outputted by the thermal flow sensor 300 and the output of the rotational angle sensor 146. Based on such calculation results, a fuel rate supplied from the fuel injection valve 152 and the ignition timing at which the ignition plug 154 is sparked are controlled. In practice, the fuel supply rate and ignition timing are further finely controlled based on the states where the intake air temperature and the throttle angle measured by the thermal flow sensor 300 change and the state where the rotational speed of the engine changes as well as the state of the air to fuel ratio measured by the oxygen sensor 148. In the idling state of the internal combustion engine, the control device 200 further controls the air rate by-passing the throttle valve 132 with an idling air control valve 156 so as to control the rotational speed of the internal combustion engine in the idling state.

2. Arrangement of Thermal Flow Sensor 300

2.1 Outer Structure of Thermal Flow Sensor 300

Figure 4A:
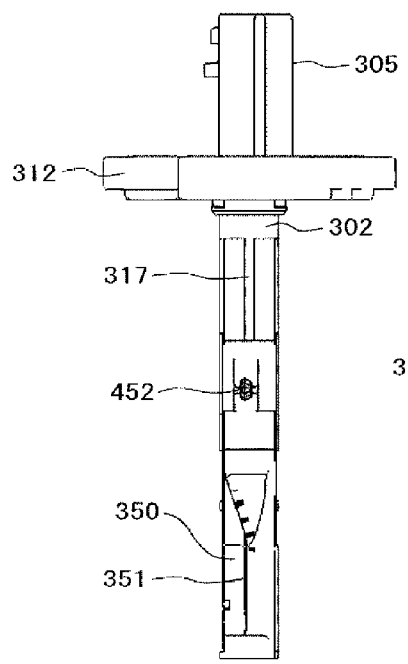
FIG. 4 shows views of the housing of the flow sensor, in which FIG. 4 (A) is a left-hand side view while FIG. 4 (B) is a frontal view thereof.
Figure 4B:
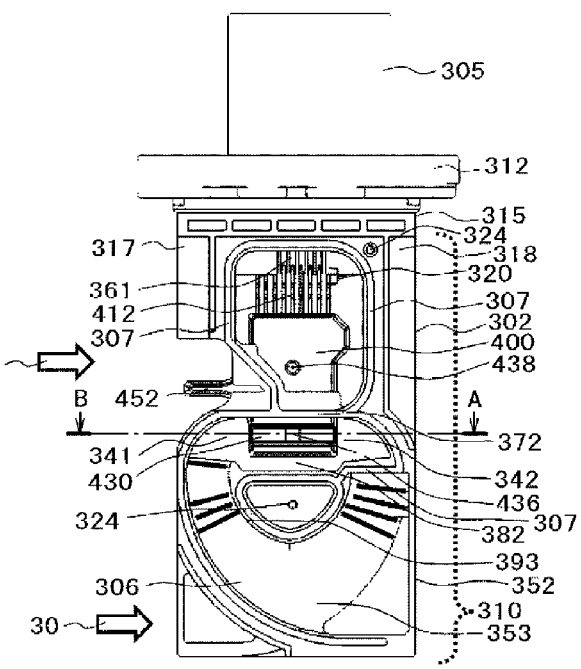

FIGS. 2, 3 and 4 show the outer looks of the thermal flow sensor 300, in which FIG. 2 (A) is a left-hand side view and FIG. 2 (B) is a frontal view thereof while FIG. 3 (A) is right-hand side view and FIG. 3 (B) is a backside view thereof. The thermal flow sensor 300 includes a housing 302, a front cover 303 and a rear cover 304. The housing 302 includes a flange 312 to fix the thermal flow sensor 300 onto the intake body corresponding to the main channel 124; an external connection section 305 provided with an external terminal to electrically connect with external instruments; and a measuring section 310 to measure a flow rate and as such. Within the measuring section 310, an auxiliary channel groove is provided to make an auxiliary channel. Further, within the measuring section 310, a circuit package 400, which is provided with a flow rate detection section to measure a flow rate of the gas to be measured 30 flowing through the main channel 124 and a temperature detection section 452 to measure a temperature of the gas to be measured 30 flowing through the main channel 124, is provided.

2.2 Advantageous Effects Brought by Outer Structure of Thermal Flow Sensor

The entrance 350 of the thermal flow sensor 300 is provided on the tip end side of the measuring section 310 extending from the flange 312 to the center direction of the main channel 124, so that a gas flowing not in the vicinity of the inner wall surface of the main channel 124, but in the vicinity of the middle section away from the inner wall surface of the main channel 124 can be taken in the auxiliary channel. This allows the thermal flow sensor 300 to measure the flow rate and temperature of the gas flowing in the sections apart from the inner wall surface of the main channel 124, which successfully subdues the deterioration of the measuring precision which might be caused thermally or for other reasons. In the vicinity of the inner wall surface of the main channel 124, it is susceptible to the temperature of the main channel 124, so that the temperature of the gas to be measured 30 results in being different from the inherent temperature of the gas flowing through the main channel 124, with the result that the temperature of the gas flowing in such vicinity differs from the average temperature condition of the gas mainly flowing through the main channel 124. In particular, when the main channel 124 corresponds to the intake body of the engine, it is susceptible to the thermal condition of the engine, so that it often happens that such channel is continuously exposed to a higher temperature. Thus, it often happens that the gas flowing in the vicinity of the inner wall surface of the main channel 124 has a higher temperature than that mainly flowing through the main channel 124, which leads to deteriorating the measuring precision.

On account that fluid resistance is higher in the vicinity of the inner wall surface of the main channel 124, the flowing speed of the gas becomes slower there than the average speed of the gas flowing through the main channel 124. Thus, the gas flowing in the vicinity of the inner wall surface of the main channel 124 being taken in as the gas to be measured 30 in the auxiliary channel, there is likelihood that the decreasing of the measured flowing speed against the average speed of the gas flowing through the main channel 124 might lead to a measuring error. With the thermal flow sensor 300 shown in FIGS. 2 and 3, the entrance 350 is provided on the tip end portion of the thinly long measuring section 310 extending from the flange 312 to the center of the main channel 124, so that the measuring error involved with the decreasing of the flowing speed in the vicinity of the inner wall surface of the main channel 124 reduces. Further, with the thermal flow sensor 300 shown in FIGS. 2 and 3, on account that not only the entrance 350 is provided on the tip end portion of the measuring section 310 extending from the flange 312 to the center of the main channel 124, but also the exit of the auxiliary channel is provided on the tip end portion of the measuring section 310, the measuring error further reduces.

The measuring section 310 of the thermal flow sensor 300 has such a shape as extending long from the flange 312 to the center direction of the main channel 124, at the tip end portion of which measuring section the entrance 350 to take in a portion of the gas such as an intake air to be measured 30 and the exit 352 to return the gas to be measured 30 from the auxiliary channel to the main channel 124 are provided. The measuring section 310 has such a shape as extending long along the axis running from the outer wall of the main channel 124 to the center thereof, but its width is shaped narrow as shown in FIG. 2 (A) and FIG. 3 (A). In other words, the measuring section 310 of the thermal flow sensor 300 is narrow in width viewed from its side surface and has substantially a rectangular shape viewed from its frontal surface. This allows the thermal flow sensor 300 to have a sufficiently long auxiliary channel so as to be capable of restraining fluid resistance against the gas to be measured 30 at a smaller value.

2.3 Structures of Upstream Side Surface and Downstream Side Surface of Measuring Section 310 and Advantageous Effects Brought by Such Structures On the upstream side surface and the downstream side surface respectively of the measuring section 310 constituting the thermal flow sensor 300, an upstream-side projection 317 and a downstream-side projection 318 are provided. The upstream-side projection 317 and the downstream-side projection 318 have such a shape as thinning out according as they proceed to their tip ends with regard to their roots, which reduces the fluid resistance of the gas to be measured 30 corresponding to the intake air flowing through the main channel 124. The upstream-side projection 317 is provided between a thermally insulating section 315 and an entrance 343. The upstream-side projection 317 is large in cross-sectional area, so that thermal conductance thereto from the flange 312 or the thermally insulating section 315 is large, but the upstream-side projection 317 discontinues in front of the entrance 343 (see FIG. 2 (B)) and further has such a shape that the distance from the side of the upstream-side projection 317 where a temperature detection section 452 is disposed to the temperature detection section 452 is elongated by a recess of the upstream-side outer wall of the housing 302 as described below. This permits thermal conductance from the thermally insulating section 315 to the support of the temperature detection section 452 to be restrained.

Further, a terminal connection section 320 as described below and a space in which the terminal connection section 320 is incorporated are formed between the flange 312 or the thermally insulating section 315 and the temperature detection section 452. Thus, the interval between the flange 312 or the thermally insulating section 315 and the temperature detection section 452 is elongated, in which elongated interval the frontal cover 303 and the rear cover 304 are provided and which elongated interval acts as a cooling surface. Accordingly, it reduces the affect on the temperature detection section 452 brought by the temperature of the wall surface of the main channel 124. Further, elongating the interval between the flange 312 or the thermally insulating section 315 and the temperature detection section 452 permits the take-in portion of the gas to be measured 30 which is guided to the auxiliary channel to be made nearer to the center of the main channel 124. This minimizes the deterioration of the measuring precision which is caused by heat transmission from the wall surface of the main channel 124.

As shown in FIG. 2 (B) and FIG. 3 (B), the measuring section 310 inserted into the main channel 124 is very narrow at its both sides and its downstream-side projection 318 and the upstream-side projection 317 have such a shape as thinning out according as they proceed to their tip ends with regard to their roots to alleviate air resistance. Thus, the increase of the fluid resistance caused by the thermal flow sensor 300 being inserted into the main channel 124 can be minimized. Further, at the portions where such downstream-side projection 318 and upstream-side projection 317 are provided, they have such a shape as protruding sideward from both sides of the front cover 303 and the rear cover 304. The upstream-side projection 317 and the downstream-side projection 318 are resin-molded, so that they are easy to be molded into a shape to alleviate air resistance while the front cover 303 and the rear cover 304 have such a shape as having a wider cooling surface. Thus, the thermal flow sensor 300 is advantageous in that air resistance is structurally alleviated and it is easy to be cooled by the gas to be measured 30 flowing through the main channel 124.

Figure 5A:
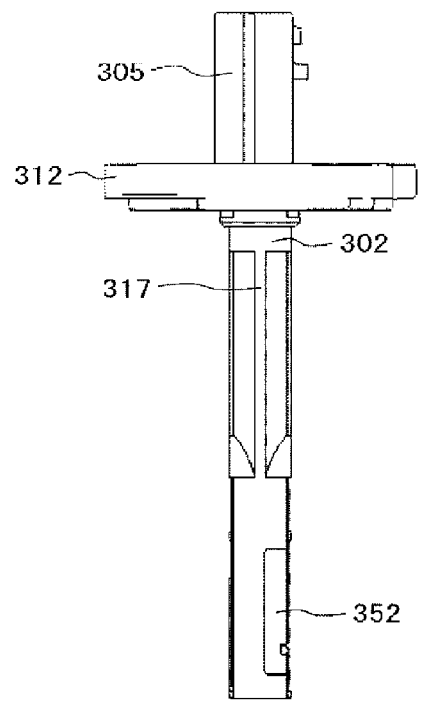
FIG. 5 shows views of the housing of the flow sensor, in which FIG. 5 (A) is a right-hand side view while FIG. 5 (B) is a backside view thereof.
Figure 5B:
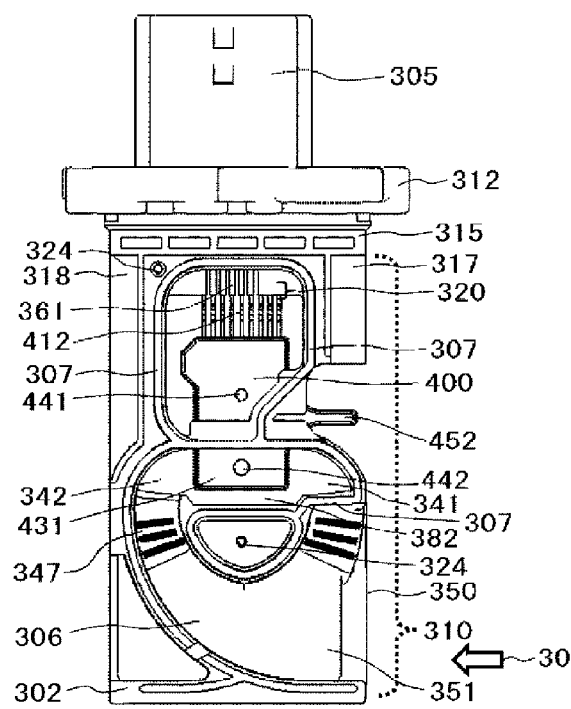

3. Entire Structure of Housing and Advantageous Effects Brought by Such Structure 3.1 Structures of Auxiliary Channel and Flow Rate Detection Section and Advantageous Effects Brought by Such Structures The states of the housing 302 with the front cover 303 and the rear cover 304 removed from the thermal flow sensor 300 are shown in FIGS. 4 and 5. FIG. 4 (A) is a left-hand side view of the housing 302 and FIG. 4 (B) is a frontal view of the housing 302 while FIG. 5 (A) is a right-hand side view of the housing 302 and FIG. 5 (B) is a backside view of the housing 302. The housing 302 has such a structure that the measuring section 310 extends from the flange 312 to the center direction of the main channel 124 and an auxiliary channel groove 306 to form an auxiliary channel is provided at the tip end side of the housing. Since an entrance groove 351 to form the entrance 350 of the auxiliary channel and an exit groove 353 to form the exit 352 are provided at the tip end portion of the housing 302, the gas flowing through the passageway apart from the inner wall surface of the main channel 124, in other words, the gas flowing through the passageway near to the center of the main channel 124 can be taken in from the entrance 350 as the gas to be measured 30. It often happens that the gas flowing in the vicinity of the inner wall surface of the main channel 124 is affected by the wall surface temperature of the main channel 124 so that it has a temperature diverted from the average temperature of the gas such as an intake air flowing through the main channel 124. Further, it also often happens that the gas flowing in the vicinity of the inner wall surface of the main channel 124 has a slower flowing speed than the average flowing speed of the gas flowing through the main channel 124. The thermal flow sensor 300 embodied herein is less susceptible to such phenomena, so that the deterioration of the measuring precision can be minimized.

In this example, it is arranged such that the auxiliary groove 306 is provided in the housing 302 to form an auxiliary channel and a cover is disposed on the front surface and the rear surface respectively of the housing 302, in which the auxiliary channel is completed by laser welding a protrusion section 307 disposed in the vicinity of the auxiliary channel groove 306 to the front cover 303 and the rear cover 304 as described below. With the adoption of such arrangement, the entire auxiliary channel groove 306 can be molded as a part of the housing 302 through the resin-molding step of the housing 302. Further, upon the housing 302 being molded, a mold is placed on each side surface of the housing 302, so that the entire auxiliary channel groove 306 can be molded as a part of the housing 302 by using such mold placed at both side surfaces of the housing. Providing the front cover 303 and the rear cover 304 on both side surfaces of the housing 302 allows the auxiliary channel of both side surfaces of the housing 302 to complete. Molding the auxiliary channel groove 306 on each side surface of the housing 302 by use of such mold permits the auxiliary channel to be molded with high precision. Productivity is enhanced as well accordingly.

With reference to FIG. 5 (B), a portion of the gas to be measured 30 flowing through the main channel 124 is taken in the auxiliary channel groove 306 at the rear side of the housing from the entrance groove 351 to form the entrance 350 and flows through the auxiliary channel groove 306 at the rear side thereof. The auxiliary channel groove 306 at the rear side has such a shape that it is inclined further to the front side of the housing according as it further proceeds, so that the gas to be measured 30 gradually moves to the front side thereof according as it flows along the auxiliary channel groove. In particular, the auxiliary channel groove 306 at the rear side thereof is provided at an upstream section 342 of the circuit package 400 with an acute inclination section 347 which is acutely inclined to the front side of the housing, so that a portion of the air having a small mass moves along the acute inclination section 347 and flows around a passage surface for measurement 430 shown in FIG. 4 (B) at the upstream section 342 of the circuit package 400. In contrast, foreign matters having a large mass are difficult to change their flowing direction at sudden due to force of inertia, so that they move around a rear side surface 431 of the passage surface for measurement shown in FIG. 5 (B).

The flow of the gas to be measured 30 in the vicinity of a heat transmission surface exposure section 436 is explained with reference to FIG. 6. At the auxiliary channel groove 306 at the front side of the housing shown in FIG. 5 (B), the air corresponding to the gas to be measured 30 which has moved from the upstream section 342 of the circuit package 400 to the auxiliary channel groove 306 at the front side of the housing flows along the passage surface for measurement 430, in which the flow rate of the air is measured through heat being transferred via the heat transmission surface exposure section 436 between the air and a flow rate detection section 602 to measure such flow rate. The gas to be measured 30 which has passed the passage surface for measurement 430 and the air which has flowed to the auxiliary channel groove 306 at the front side of the housing from the downstream section 341 of the circuit package 400 flow together along the auxiliary channel groove 306 at the front side thereof and are discharged from the exit groove 353 to form the exit 352 to the main channel 124.

The foreign matters having a large mass such as dirt and dust mixed with the gas to be measured 30 have a large force of inertia, so that they are difficult to change their flowing direction at sudden towards the direction to which the groove is acutely inclined to the front side of the housing along the surface of the acute inclination section 347 shown in FIG. 5 (B) at which the groove is inclined at sudden to the front side thereof. Thus, such foreign matters having a large mass move around the rear side surface 431 of the passage surface for measurement, so that it can restrain such foreign matters from flowing near the heat transmission surface exposure section 436. According to the present example, it is arranged such that most of foreign matters having a large mass excepting the gas pass the rear side surface 431 of the passage surface for measurement which is the backside surface of the passage surface for measurement 430, so that contamination caused by such foreign matters as greases, carbons and dusts can be subdued, with the result the deterioration of the measuring precision can be minimized. In other words, the auxiliary channel groove at the rear side of the housing has such a shape that it makes the flowing direction of the gas to be measured 30 change at sudden along the axis running crosswise with the flowing axis of the main channel 124, so that such foreign matters to be mixed with the gas to be measured 30 can be minimized in operation.

According to the present example, as shown in FIG. 4 (B), the passage constituted by the auxiliary channel grove 306 at the rear side of the housing is curvedly directed from the tip end section of the housing 302 to the flange 312, in which at the location nearest to the flange 312 the gas flowing through the auxiliary channel counter-flows against the flow of the main channel 124, at which location (where such counter-flow occurs) the auxiliary channel at the rear side of the housing on one hand communicates with the auxiliary channel at the front side thereof on the other side. Such arrangement facilitates the heat transmission surface exposure section 436 of the circuit package 400 to be fixed on the auxiliary channel and the gas to be measured 30 to be taken in at a location nearer to the center section of the main channel 124 as well.

According to the present example, the passage surface for measurement 430 on which the flow rate detection section 602 is provided is disposed such that it penetrates from the inside of the auxiliary channel groove 306 at the rear side of the housing to the inside of the auxiliary channel groove 306 at the front side thereof in an anterior and posterior relationship with regard to the flowing direction. That is to say, the tip end side of the circuit package 400 is not arranged such that it is supported by the housing 302, but it structurally protrudes into a cavity section 382. This cavity section 382 is arranged with the space of the upstream section 342 of the circuit package 400 connected with the space of the downstream section 341 thereof. As the structural arrangement which penetrates through the upstream section 342 of the circuit package 400 and the downstream section 341 of the circuit package 400, the auxiliary channel through which the gas to be measured 30 moves from the auxiliary channel grove 306 at the rear side of the housing on one hand to the auxiliary channel groove 306 at the front side thereof on the other side is formed. Such structural arrangement allows the auxiliary channel groove 30 to be molded on each side surface of the housing 302 through the sole resin-molding step and the structure connecting the auxiliary channel groove 306 on each side surface of the housing 302 to be concurrently molded.

Upon the housing 302 being molded, clamping both sides of the passage surface for measurement 430 formed on the circuit package 400 with molds permits the structure which penetrates through the upstream section 342 of the circuit package 400 and the downstream section 341 of the circuit package 400 to be molded. Then, at the same time as the resin-molding of the housing 302, the circuit package 400 can be mounted on the housing 302. Molding the housing 302 with the circuit package 400 inserted into the molds of the housing 302 permits the circuit package 400 and the heat transmission exposure section 436 to be mounted with respect to the auxiliary channel with high precision. To note, upon the housing 302 being molded, a connection terminal 412 of the circuit package 400 and an inner end 361 of the external terminal of the external connection section 305 are in the molded state. Thus, after the housing being molded, the wirings of such terminals are bonded to each other by welding or soldering so as to be rendered into a terminal connection section 320, thereby, the housing 302 being brought to completion.

Further, according to the present example, the gas to be measured 30 flows dividedly into the passage surface for measurement 430 and its backside surface, in which the heat transmission surface exposure section 436 to measure a flow rate is provided on one side of such surfaces, but the gas to be measured 30 may pass only through the front side of the passage surface for measurement 430 without the gas being divided into two passages. Curving the auxiliary channel such that it goes along the second axis in the direction running crosswise with the first axis in the direction to which the gas flows through the main channel 124 permits foreign matters mixed with the gas to be measured 30 to be lopsided to one side of the second axis with a small curvature and providing the passage surface for measurement 430 and the heat transmission surface exposure section 436 on the side of the second axis with a large curvature allows the interference of such foreign matters to be minimized. To note, according to the present example, it is in the connection section between the auxiliary channel grove 306 of the front side of the housing and the auxiliary channel groove 306 of the rear side thereof that the passage surface for measurement 430 and the heat transmission surface exposure section 436 are provided. However, they may be provided not in such connection section, but at the auxiliary channel groove 306 of the front side thereof or at the auxiliary channel groove 306 of the rear side thereof.

A throttle configuration is formed at the heat transmission surface exposure section 436 to measure the flow rate which is provided on the passage surface for measurement 430, by the effect brought by such configuration the flowing speed is increased so that the measuring precision improves. Further, provided that there occurs a whirl in the gas flow at the upstream side of the heat transmission surface exposure section 436, such whirl can be brought into extinction or minimized through such throttle configuration, so that the measuring precision improves.

Figure 6:
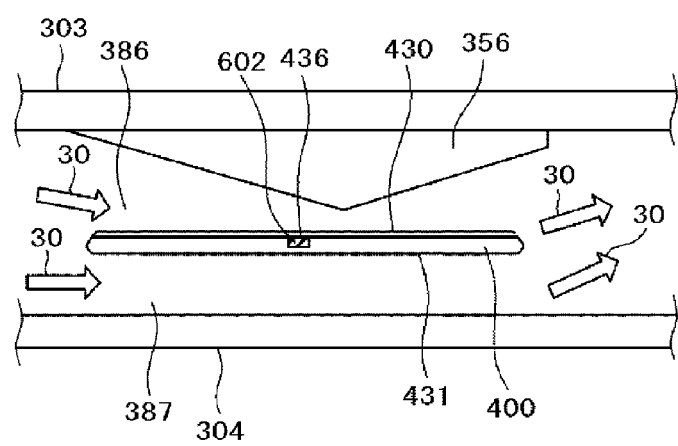
FIG. 6 is a partly enlarged view showing the state of a flow passage surface disposed in the auxiliary channel section.

3.2 Structure of Flow Rate Detection Section of Auxiliary Channel and Advantageous Effects Brought by Such Structure FIG. 6 is an enlarged view showing the state in which the passage surface for measurement 430 of the circuit package 400 is disposed within the auxiliary channel groove 306 and corresponds to the cross section taken along A-B line shown in FIG. 4 (B). To note, the view shown in FIG. 6 is a conceptual illustration so that against the detailed views shown in FIGS. 4 and 5 the detailed portions are omitted and simplified and such detailed portions are a little modified in FIG. 6. The left side portion of FIG. 6 corresponds to the terminal end portion of the auxiliary channel groove 306 of the rear side of the housing while the right side portion thereof corresponds to the initial end portion of the auxiliary channel groove 306 of the front side thereof. On both right and left sides of the circuit package 400 provided with the passage surface for measurement 430, a get-through section is provided, so that on both right and left sides of the circuit package 400 provided with the passage surface for measurement 430 the auxiliary channel groove 306 of the rear side of the housing and the auxiliary channel groove 306 of the front side thereof are connected with each other, though it is not explicitly shown in FIG. 6.

The gas to be measured 30 which has been taken in from the entrance 350 and has flowed through the backside auxiliary channel constituted by the auxiliary channel groove 306 of the rear side of the housing is guided from the left side with respect to the sheet in which FIG. 6 is shown and a portion of the gas to be measured 30 flows on the passage surface for measurement 430 and around a passage 386 made by a protrusion section 356 provided on the front cover 303 while the other portion of the gas to be measured 30 flows on the backside surface 431 of the passage surface for measurement and around a passage 387 made by the rear cover 304. Thereafter, the gas to be measured 30 which has flowed around the passage 387 moves to the auxiliary channel groove 306 of the front side of the housing through the get-through section of the downstream section 341 of the circuit package 400 and meets with the gas to be measured 30 flowing around the passage 386 so as to be discharged from the exit 32 to the main channel 124 with flowing through the auxiliary channel groove 306 of the front side thereof. The auxiliary channel groove 306 is formed such that the passage 386 around which a portion of the gas to be measured 30 flows through the get-through section of the upstream section 342 of the circuit package 400 from the auxiliary channel groove 306 of the rear side of the housing has a larger curvature than the passage 387 around which the other portion of the gas flows, so that such foreign matters having a large mass as dusts mixed with the gas to be measured 30 gather around the passage 387 with a smaller curvature. Thus, there is hardly any case where such matters flow into the passage 386.

At the passage 386, a throttle configuration is formed by the protrusion section 356 which is provided on the front cover 303 in succession to the topmost end portion of the auxiliary channel groove 306 of the front side of the housing gradually protruding to the passage surface for measurement 430. The passage surface for measurement 430 is disposed on one side of the throttle configuration of the passage 386. On this passage surface for measurement 430, the heat transmission surface exposure section 436, through which the flow rate detection section 602 transfers heat with the gas to be measured 30, is provided. In order that the measurement of the flow rate detection section 602 is performed with high precision, it is preferred that the gas to be measured 30 be a laminar flow with rarely any whirl at the heat transmission surface exposure section 436. In this relation, the faster the flowing speed is, the further the measuring precision improves. For that purpose, a throttle configuration is formed by the protrusion section 356 provided on the front cover 303 opposed to the passage surface for measurement 430 smoothly protruding towards the passage surface for measurement 430. This throttle configuration acts as reducing a whirl of the gas to be measured 30 into a laminar flow as substantially as possible. Further, at the throttle configuration, the flowing speed becomes faster, at which the heat transmission surface exposure section 436 to measure the flow rate is disposed, so that the measuring precision of the flow rate improves.

Forming a throttle configuration by making the protrusion section 356 protrude into the auxiliary channel groove 306 such that it is opposed to the heat transmission surface exposure section 436 provided on the passage surface for measurement 430 permits the measuring precision to improve. The protrusion section 356 to form the throttle configuration is to be provided on the cover opposed to the heat transmission surface exposure section 436 provided on the passage surface for measurement 430. It is shown in FIG. 6 that the protrusion section 356 is provided on the front cover 303, as the cover opposed to the heat transmission surface exposure section 436 provided on the passage surface for measurement 430 is the front cover 303, but such protrusion section may be provided on either the front cover 303 or the rear cover 304, which is opposed to the heat transmission surface exposure section 436 provided on the passage surface for measurement 430. Depending on at which side surface of the housing the passage surface for measurement 430 and the heat transmission surface exposure section 436 in the circuit package 400 are provided, it decides which side surface the cover opposed to the heat transmission surface exposure section 436 corresponds to.

With reference to FIGS. 4 and 5, it is shown that a press imprint 442 of a mold used during the resin-molding step of the circuit package 400 is left on the backside surface 431 of the passage surface for measurement which is the backside surface of the heat transmission surface exposure section 436 provided on the passage surface for measurement 430. The press imprint 442 does not necessarily hinder the flow rate from being measured, so that there is no problem even when such imprint 442 is left over there. Further, as commented below, upon the circuit package 400 being resin-molded, it is essential to protect a semiconductor diaphragm provided on the flow rate detection section 602. Thus, it is important to press the backside surface of the heat transmission surface exposure section 436 during the resin-molding. Further, due care shall be taken so that the resin covering the circuit package 400 is not flowed into the heat transmission surface exposure section 436. In view of the foregoing, the flow-in of the resin is prevented such that the passage surface for measurement 430 including the heat transmission surface exposure section 436 is enclosed with a mold and the backside surface of the heat transmission surface exposure section 436 is pressed with another mold. The circuit package 400 is formed by transfer molding, so that pressure applied to the resin becomes high, which requires that the backside surface of the heat transmission surface exposure section 436 be pressed with such mold. Further, the semiconductor diaphragm is used for the flow rate detection section 602, so that it is preferred that a ventilation passage for the air gap made by such semiconductor diaphragm be formed. It is critical to press the backside surface of the heat transmission surface exposure section 436 with such mold in order to hold in place a plate and as such to form such ventilation passage.

3.3 Shapes of Front Cover 303 and Rear Cover 304 and Advantageous Effects Brought by Such Shapes FIG. 7 shows outer looks of the front cover 303, in which FIG. 7 (A) is a left-hand side view and FIG. 7 (B) is a frontal view while FIG. 7 (C) is a plan view thereof. FIG. 8 shows outer looks of the rear cover 304, in which FIG. 8 (A) is a left-hand side view; FIG. 8 (B) is a frontal view; and FIG. 8 (C) is a plan view thereof. With reference to FIGS. 2 and 3, the front cover 303 and the rear cover 304 are used for forming the auxiliary channel in such a manner that they occlude the auxiliary channel groove 306 of the housing 302. Further, they are provided with the protrusion section 356, which section is used for providing a throttle configuration in the passage. Such front cover 303 and rear cover 304 are formed by the resin-molding step in which a thermoplastic resin is poured into a mold, so that they can be formed with high molding precision. Further, in the front cover 303 and the rear cover 304, a protrusion section 380 and a protrusion section 381 are formed, which sections are arranged such that they fill in a gap of the cavity section 382 at the tip end side of the circuit package 400 shown in FIG. 4 (B) and FIG. 5 (B) and simultaneously cover the tip end portion of the circuit package 400.

A protection section 322 is formed in the front cover 303 and the rear cover 304 shown in FIGS. 7 and 8. As shown in FIGS. 2 and 3, the protection section 322 of the front side which is provided on the front cover 303 is disposed on the front side surface of an entrance 343 to a temperature detection section 452 into which the gas to be measured 30 enters while the protection section 322 of the rear side which is provided on the rear cover 304 is disposed on the rear side surface of such entrance 343. The temperature detection section 452 disposed within the entrance 343 is protected by the protection section 322, so that it can prevent the temperature detection section 452 from being mechanically damaged e.g. by colliding with something during the production of the flow sensor and during the installation thereof to a vehicle.

The protrusion section 356 is provided on the inner side surface of the front cover 303, which section, as exemplified in FIG. 6, is disposed opposed to the passage surface for measurement 430 and has such an elongated shape that it extends in the direction along the passage axis of the auxiliary channel. The cross-sectional shape of the protrusion section 356, as shown in FIG. 7 (C), may be inclined towards the downstream side with the apex of the protrusion section seen as a boundary between both sides. The throttle configuration is formed on the aforementioned passage 386 by both the passage surface for measurement 430 and the protrusion section 356 and acts as reducing a whirl generated in the gas to be measured 30 into a laminar flow. According to the present example, the auxiliary channel having a throttle configuration is divided into a groove section and a cover section to cover the groove and to complete a passage provided with a throttle configuration, in which the groove section is formed by the resin-molding step to form the housing 302; then the front cover 303 provided with the protrusion section 356 is formed by another resin-molding step; the groove is covered with the front cover 303 acting as a cover for the groove, thereby, the auxiliary channel being formed. During the resin-molding step in which the housing 302 is formed, the circuit package 400 provided with the passage surface for measurement 430 is also fixed to the housing 302. In this way, carrying out the formation of the groove complicated in shape with the resin-molding step and providing the front cover 303 with the protrusion section 356 for throttle allows the passage 386 shown in FIG. 6 to be formed with high precision. Further, the dispositional relationship among the groove, the passage surface for measurement 430 and the heat transmission surface exposure section 436 can be maintained with high precision, so that inconsistency in quality of mass-produced products is minimized, with the result that the measuring result is enhanced in precision. Moreover, productivity also improves accordingly.

The formation of the passage 386 mentioned above is methodically applicable to the formation of the passage 387 through the rear cover 304 and the backside surface 431 of the passage surface for measurement. The passage 387 is divided into the groove section and the cover section, in which the groove section is formed by the aforementioned resin-molding step adopted upon the housing 302 being formed and the groove is covered with the rear cover 304, thereby, the passage 387 being formed. Forming the passage 387 this way allows the same to be structured with high precision, which also leads to improving productivity.

Further, an insertion hole 326 is provided through the front cover 303 and the rear cover 304 for the initial positioning of the housing, the front cover and the rear cover when they are laser welded to one another. Such initial positioning is feasible by setting an ejector pin 324 formed on the housing 302 and shown in FIGS. 4 and 5 on the basis of such insertion hole 326. To note, an insertion hole 326 and an ejector pin 324 are provided for such positioning at two places, but it is preferred that the size of the insertion hole 326 be somewhat larger than that of the ejector pin 324 less that the further the pin is inserted into the hole, the tighter they are clamped to each other. This is due to the fact that if the ejector pin 324 is forcedly shoved into the insertion hole 326, a gap occurs in the boding section, so that there are some cases where the housing, the front cover and the rear cover are not laser welded to one another.

4. Laser-Welding Structure of Housing and Covers and Advantageous Effects Brought by Such Structure The thermal flow sensor 300 according to the present invention is principally characterized in the method of laser-welding the housing 302, the front cover 303 and the rear cover 304 and the same structure. Hereafter, for the materials of the housing 302, the front cover 303 and the rear cover 304, polybutyleneterephtalate (PBT), polyphenylenesulfide (PPS), nylon 6 (PA6), nylon 66 (PA66) and nylon 6T (PA6T) which are crystalline resins high in heat resistance are often adopted.

The laser-welding is a bonding method characterized in that after a laser beam is irradiated onto a light absorbing resin through a light transmitting resin with the light transmitting resin overlapped over the light absorbing resin so as to make the light absorbing resin fused, the light transmitting resin is inclusively fused so as to make the resins bonded to each other. Thus, it is preferred that natural resinous materials which are free from color pigments and as such and have a property and thickness to transmit a laser beam by 20% or more be adopted for the light transmitting materials of the front cover 303 and the rear cover 304. In contrast, it is preferred that the light absorbing resinous material of the housing 302 be blackened with carbon black contained therein. Further, with the thermal flow sensor 300 according to the present invention, an especially high precision and stability in dimension is required for the housing. Thus, it often happens that vitreous materials in the order of 20 to 40% by weight are added to the material of the housing. However, there is tendency that adding such vitreous materials thereto deteriorates the laser transmittance of the housing. For this reason, it is preferred that the percentage in content by which glass fibers are added to the thermoplastic resin from which the housing 302 is made be the percentage in content by which glass fibers are added to the thermoplastic material from which the covers 303 and 304 are made. Further, as for the crystalline thermoplastic rein, it is known that the lower the mold temperature is during the molding step, the lower its crystallization becomes (in the situation where macromolecules are split into the crystalline state in which they are regularly aligned and the non-crystalline state in which they exist with the shape of incidental looping or entangled with one another, the proportion of the crystalline portions is referred to as crystallization, which is defined as follows: (Crystallization)= (Specific Volume of Crystalline Portions) (Sum of Specific Volume of Crystalline Portions and that of Non-crystalline Portions)) and the higher its transmittance becomes. Thus, it is preferred that the crystallization of the thermoplastic resin from which the housing 302 is made be that of the thermoplastic resin from which the covers 303 and 304 are made. Further, in the aspect of the dimensional precision, it is preferred that not only glass fibers be added to the resinous material of the housing 302, but also an alloy based polymer containing a non-crystalline resin be adopted for such material.

As for the beam sources used for the laser-welding step, such lasers as having wavelengths in the infrared region including a semiconductor laser, a YAG laser, a fiber laser are favorable in respect of cost performance, but lasers having the other wavelengths may be adopted for the beam sources according to the absorptivity of the light absorbing resin. The intensity distribution of the laser beam source can be varied according to the types of the lens attached thereto, which includes a Gaussian beam, a top-hat beam, a ring-shaped beam and so forth. Among them, the top-hat beam and the ring-shaped beam are more favorable to use, as laser-welding is more uniformly achieved. Upon the laser beam being irradiated onto the product, laser-welding may be performed on the product by physically moving the laser beam source or the product itself on the stage or the laser beam may be irradiated thereon by controlling the laser beam itself by use of a galvano mirror.

FIG. 9 exemplifies the laser-welding section and the laser-welding structure of the housing 302 of the thermal flow sensor 300 according to the present example, in which FIG. 9 (A) is a top view showing the state where the front cover 303 is cut and removed at the welded sections 390 and 391 of the housing 302 while FIG. 9 (B) corresponds to the cross-sectional view taken along C-D cutout line of the welded section 391 of the auxiliary channel section (in which it is shown that the front cover 303 is bonded to the housing). The present example is characterized in that the protrusion sections 308 and 309 are provided on each end of the bonding section 331 of the front cover 303 (herein, the rear cover 304 being also formed in the same way) corresponding to the welded section 391 surrounding both sides of the auxiliary channel groove over the housing 302 such that it intervenes between such both sides; and the height H1 of the projection 308 formed on the side of the auxiliary channel is made higher than the height H2 of the projection 309 formed on the opposite side to the auxiliary channel, so that it is arranged such that burrs generated by laser-welding are restrained from protruding to the side of the auxiliary channel. Here, the method of bonding the covers and the housing through laser-welding is explained below in a concrete manner.

In the first place, the housing 302 is set on the predetermined position; and the insertion holes 326 formed through the covers 303 and 304 are positioned against the ejector pin 324 formed on the housing 302 so as to make the ejector pin inserted into the holes 326, thereby, the covers 303 and 304 being positioned on the housing with high precision. Hereupon, the covers and the housing are positioned to one another such that the bonding sections 331 formed on the inner surfaces of the covers 303 and 304 are overlapped over the protrusion section 307 formed on the housing 302. Thereafter, the covers 303 and 304 as well as the housing 302 are pressed with a transparent pressing member made from glass and an acrylic resin and as such. To note, it is preferred that the pressure applied to them be 0.1 MPa or higher in order to reduce a gap between the upper surface of the protrusion section 307 of the housing 302 and the bonding sections 331 of the covers 303 and 304.

Then, with such pressure kept intact, the upper surface of the protrusion section 307 of the housing 302 in the periphery of the circuit chamber and the bonding sections 331 of the covers 303 and 304 are subjected to laser-welding so as to form the welded section 390 and further the upper surface of the protrusion section 307 of the housing 302 in the periphery of the auxiliary channel and the bonding sections 331 of the covers 303 and 304 are subjected to laser-welding such that the auxiliary channel is formed so as to form the welded section 391. To note, as for the processing order in which a laser beam is irradiated, it may be arranged such that after the auxiliary channel is laser-welded, the circuit chamber is laser-welded. However, on account that there is tendency that the beginning point and the ending point of the laser irradiation becomes unstable, so that it is preferred especially in the case of the circuit chamber that the positions of such beginning and ending points be displaced from the welded section 390.

Here, our findings on such structure to restrain such burrs from protruding to the side of the auxiliary channel and the aforementioned laser-welding method are elaborated further as follows. As shown in FIG. 10 (A), where the covers 303 and 304 are laser-welded to the housing 302, on account that a laser beam 500 is irradiated with the covers and the housing pressed with a transparent pressing member not shown in the drawings, there are some cases where a part of the fused resin turns out to be burrs according to the power energy of the laser beam 500. When such burrs come to protrude up to the inside of the auxiliary channel, there occurs turbulence in the gas to be measured flowing through the auxiliary channel according to the degree to which such burrs protrude and the places where they protrude so that there are some cases where the flow rate of the gas to be measured 30 cannot be measured with high precision with the flow rate detection section 602 disposed within the auxiliary channel. However, the protruding burrs badly affect the measuring characteristics of the thermal flow sensor 300, but the advantages related with such burrs, inter alia, lie in the facts that the welding strength is enhanced with the power energy strong enough to generate such burrs and in the aspect of reliability the formation of such burrs contributes to alleviating stress and improving on the welding strength. In particular, upon laser-welding being performed, there are some cases where the covers 303 and 304 are thinned down for the purpose of prioritizing the laser transmittance of the covers 303 and 304, but it sometimes causes a problem with the welding strength. In such a case, the formation of such burrs plays the big role to improve on the welding strength and rigidity.

Thus, the present inventors, as the structure which restrains burrs from protruding to the auxiliary channel and contributes to enhancing the welding strength, have conceived the idea that the protrusion sections 308 and 309 are provided on each end of the bonding section 331 of the covers 303 and 304 respectively which corresponds to the welded section 391 on the side of the auxiliary channel and the height H1 of the projection 308 formed on the side of the auxiliary channel is made higher than the height H2 of the projection 309 formed on the opposite side to the auxiliary channel. In order to restrain normally observed burrs from protruding thereto, the present inventors have considered that a projection large in height would be provided on each end of the bonding section 331 of the covers 303 and 304 respectively, but have found in the end that there being sections large in height within the covers 303 and 304, the fluidity of the resin is hampered so that the laser transmittance of the boding section 331 of the covers 303 and 304 respectively which corresponds to the welded sections 390 and 391 of the housing 302 is deteriorated. Further, in the case of the thermal flow sensor 300, enlarging the interval between the protrusion section 307 of the housing 302 and the protrusion sections 308 and 309 of the covers 303 and 304 respectively on the side of the auxiliary channel causes turbulence in the gas to be measured, so that it is preferred that the interval between the protrusion section 307 of the housing 302 and the protrusion sections 308 and 309 of the covers 303 and 304 respectively be as small as possible, but the present inventors have also found that with such structure implemented to try to enforce the resinous burrs to be closed in, it results in there being no room for the resin to escape, so that the internal pressure generated at the laser-welding causes excessive residual stress, with the result that the reliability with the bonding section is deteriorated on the contrary.

Thus, providing the protrusion section 308 large in height on one side of the bonding section 331 of the covers 303 and 304 respectively against the welded section 391 of the housing 302 according to the present example permits the deterioration of the laser transmittance to be minimized and the burrs to be effectively utilized for alleviating the residual stress and improving on the welding strength, which structure successfully prevents the measuring characteristics of the flow rate from deterioration and secures the bonding condition high in reliability. To note, according to the present arrangement, it is preferred that the height H1 of the protrusion section 308 formed on the side of the auxiliary channel be higher by 0.3 mm to 0.5 mm than the surface position of the welded section 391 with the housing 302. Provided that such height is larger than that, the degree to which the laser transmittance deteriorates is aggravated while provided that such height is smaller than that, the burrs come to protrude up to the inside of the auxiliary channel. In contrast, it is preferred that the height H2 of the protrusion section 309 formed on the opposite side to the auxiliary channel be within the range of 0 to 0.2 mm, within which range it is found that there is a little affect on the deterioration of the laser transmittance or there is no affect thereon. Further, in order to efficiently generate burrs, it is advantageous that an inclination is provided on the side surfaces of the protrusion section 307 formed on the housing 302 and the incident laser spot diameter W2 is larger than the width W1 of the flat section at the tip end of the protrusion section 307 of the housing 302 as shown in FIG. 10. Providing inclinations on the side surfaces of the protrusion section 307 allows fillet by burrs to be formed so as to improve on welding reliability. To note, trying to generate burrs by making the incident laser spot diameter smaller than the width W1 of the flat section of the protrusion section formed on the housing 302 causes the laser beam with an excessive power energy to be irradiated onto the laser beam application portion so that it often happens that such portion results in being full of voids.

The present arrangement is applied to the entire auxiliary channel with reference to FIG. 9, but it may be locally applicable according to the characteristics of the thermal flow sensor 300 and the strength design required for the welding reliability. Further, due to the designing of the thermal flow sensor 300, there are cases where both sides interposing the welded section 391 are structured into auxiliary channels, in which case the application of the present arrangement depends on the sensitivity of the measuring characteristics of the flow rate. For instance, in the case of the structure shown in FIG. 9 (A), the entrance and the exit of the auxiliary channel affect the measuring characteristics of the flow rate to the least, so that it may be arranged such that the protrusion sections directed for such entrance and exit are reduced in size.

Example 2

Figure 11:
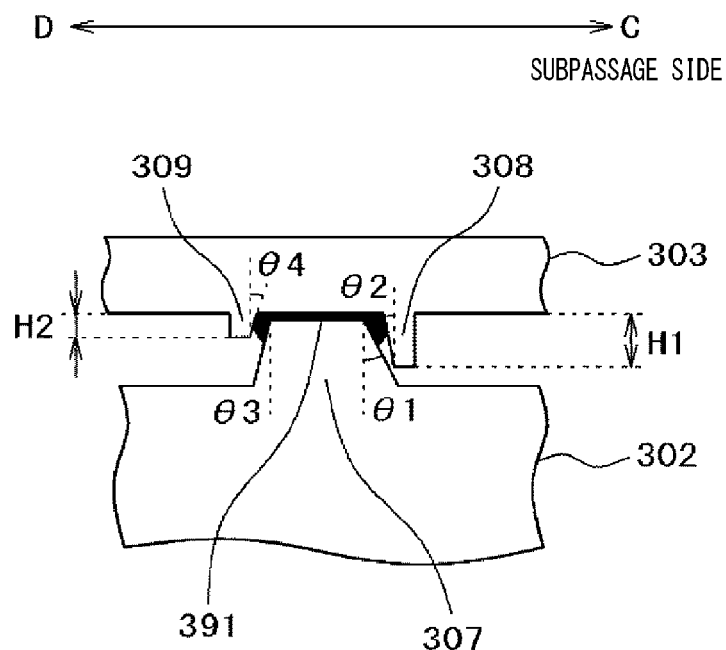
FIG. 11 is a cross-sectional view showing a modified example to explain the laser welding structure at the auxiliary channel section for the front cover and the housing.

FIG. 11 is a view showing another example of the thermal flow sensor 300 and the laser-welding structure according to the present invention, in which an inclination is provided on the protrusion section 307 of the housing 302 and the protrusion section 308, which is on the side of the auxiliary channel of the bonding section 331 of the covers 303 and 304 respectively, to be laser-welded to each other, in which the inclination angle θ1 of the protrusion section 307 of the housing 302 is made larger than the inclination angle θ2 of the protrusion section 308 of the covers 303 and 304 respectively. The present arrangement prevents a portion of the burrs, provided that they are peeled off, from falling into the auxiliary channel. Further, making the inclination angle θ4 of the protrusion section 309 provided on the opposite side to the auxiliary channel larger than the inclination angle θ3 of the protrusion section 307 of the housing 302 provided on the opposite side to the auxiliary channel permits the bonding area by burrs to be further secured and the welding strength to improve accordingly.

Example 3

Figure 12:
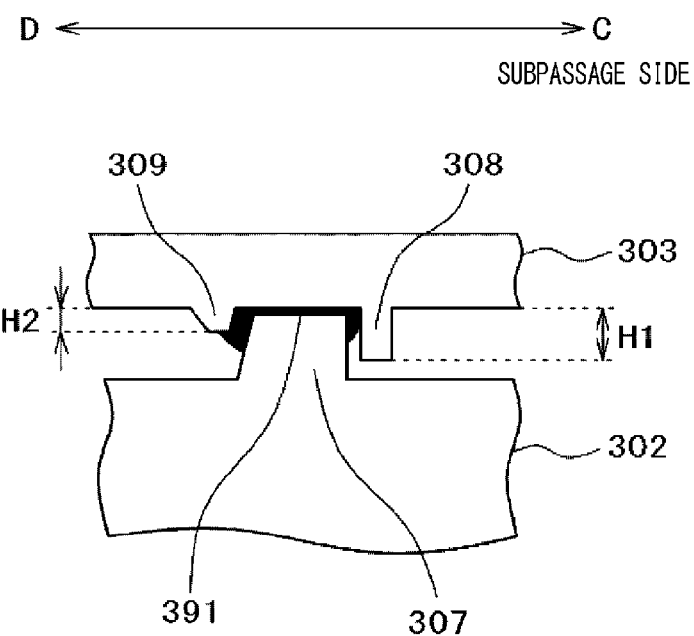
FIG. 12 is a cross-sectional view showing a modified example to explain the laser welding structure at the auxiliary channel section for the front cover and the housing.

FIG. 12 is a view showing another example of the thermal flow sensor and the laser-welding structure according to the present invention, in which the amount of burrs generated on the laser-welded section 391 is increased on the opposite side to the auxiliary channel and the burrs extend further than the height of the protrusion section 309. As mentioned above, trying to enforce the resinous burrs to be closed in with the protrusion section at the time of laser-welding, there are some cases where the welding reliability with the bonding section is deteriorated. In such case, such reliability can be enhanced by not closing in the opposite side of the protrusion section to the auxiliary channel and generating a lot of burrs on such side. In other words, making the degree to which the burrs protrude larger than the height H2 of the protrusion section provided on the opposite side to the auxiliary channel permits further enhanced reliability with the bonding section to be secured. As the means to implement the present arrangement, it is favorable that the laser beam spot center is disposed on the opposite side of the protrusion section 307 of the housing 302 to the auxiliary channel rather than on the center section thereof. To note, when the present arrangement causes a problem with the shapely design of the thermal flow sensor 300, due care shall be taken so that the length between the welded section 391 of the housing 302 and the exposed surface of the covers 303 and 304 respectively is enlarged.

To note, in the same structure as adopted for forming the welded section 391 of the auxiliary channel section, also as for the welded section 390 on the circuit chamber side, it may be arranged such that protrusion sections different in height are formed on each end of the bonding section 331 of the covers 303 and 304 respectively, thereby, the burrs are generated. In the case of the thermal flow sensor 300 according to the present invention, within the circuit chamber, the wirings of the connection terminal 412 of the circuit package 400, the inner end 361 of the external terminal of the external connection section 305 and the terminal connection section 320 in which such terminals are bonded to each other and as such are formed, so that it is required to seal the circuit chamber to prevent such wirings from being short-circuited and corroded. Thus, the welding quality and reliability high enough to secure air-tightness with which a corrosive gas and water vapor are blocked are required for the circuit chamber. Applying the present arrangement also to the circuit chamber side permits not only the reliability of the auxiliary channel, but also that of the circuit chamber to be enhanced. In the case of the present arrangement, a higher protrusion section may be provided either on the inner side of the cover or on the outer side thereof, but taken it into account that an opening 438 is within the circuit chamber, it is preferred that such higher protrusion section be provided on the inner side thereof. However, in the case of the thermal flow sensor 300 according to the present invention, there is partly a welded section to form the auxiliary channel and the circuit chamber in common, in which case it is required that the auxiliary channel be prioritized.

Example 4

FIG. 13 is a view showing another example of the thermal flow sensor 300 and the laser-welding structure, in which minute irregularities 392 are formed on the portion corresponding to the adhered surface between the protrusion section 308 formed on the end portion of the bonding section 331 of the covers 303 and 304 respectively and the burrs, thereby, the wielding strength being enhanced. The present laser-welding arrangement is such that a laser beam 500 transmitted through the covers 303 and 304 fuses the resin from which the housing 302 is made and the fused resin is adhered onto the covers 303 and 304, thereby, the covers and the housing being laser-welded to one another. Thus, with minute irregularities 392 formed on the resin from which the covers 303 and 304 are made, the fused resin flow into such irregularities, which contributes to enhancing the welding strength. It is preferred that such minute irregularities 392 be formed on the mold, whose roughness average (Ra) is preferably defined as being within the range of 1.0 to 3.0 μm. Where such roughness average goes beyond such range, the fused resin is not filled in such irregularities so that the bonding strength is deteriorated. To note, provided that such minute irregularities 392 are provided even on the portion corresponding to the adhered surface between the covers 303 and 304 respectively and the housing 302, the laser beam is scattered on such adhered surface, so that there are some cases where the laser-welding condition is deteriorated according to the degree to which a gap between the covers respectively and the housing is formed. Taken such cases into account, it is preferred that such minute irregularities 392 be provided only on the adhered surface between the protrusion section and the burrs.

Further, the concept of present invention is also applicable to the other products whose technical problem is similar to that of the present invention besides the thermal flow sensor 300 and is adoptable for the laser-welding of the thermoplastic resins as a whole. As the non-crystalline thermoplastic resins, Polystyrene (PS), Acrylonitrile Styrene (AS), Acrylonitrile Butadiene Styrene copolymer (ABS), Polyetherimide (PEI), Polycarbonate (PC), Polyarylate (PAR), PolyMethyl Methacyrlate (PMMA), Cyclo-olefin Polymer (COP), Cyclo-olefin Copolymer (COC), Polysulfone (PSF), Polyethersulfone (PES), Polyvinyl Chloride (PVC) and polyvinylidene Chloride (PVDC) are exemplified herein. As the crystalline resins, other than noted above, Polyethylene (PE), polypropylene (PP), Polyoxymethylene (POM), Polyethyleneterephtalate (PET), polytrimethylene-terephtalate (PTT), Polyethylenenaphthalate (PEN), polyetheretherketone (PEEK), Liquid Crystal Polymer (LCP) and polytetrafluoroethylene (PTFE) are exemplified herein. Alloy based polymers containing such non-crystalline resins, such inorganic materials as glass fibers and the thermoplastic resins containing a special additive are also covered by the present invention. Generally speaking, the non-crystalline resins are excellent in moldability and transparency while the crystalline resins are excellent in heat-resistance and chemical resistance. Further, the present invention is applicable to not only the aforementioned thermoplastic resins, but also thermosetting resins such as epoxy based resins.

In the examples presented herein, they are explained separately from each other, but it shall be appreciated that they are not irrelevant to each other, rather, there is relationship between them in that one of them corresponds to a partly modified or an entirely modified example of the other.

REFERENCE SIGNS LIST

24: exhaust gas,
30: gas to be measured,
110: engine cylinder,
112: engine piston,
114: engine piston,
116: intake valve,
118: exhaust valve,
122: air cleaner,
124: main channel,
126: throttle body,
128: intake manifold,
132: throttle valve,
144: throttle angle sensor,
146: rotational angle sensor,
148: oxygen sensor,
152: fuel injection valve,
154: ignition plug,
156: idling air control valve,
200: control device,
300: thermal flow sensor,
302: housing,
303: front cover,
304: rear cover,
305: external connection section,
306: auxiliary channel groove,
307: protrusion section of housing for laser-welding,
308: protrusion section of cover on auxiliary channel side,
309: protrusion section of cover on opposite side to the auxiliary channel,
310: measuring section,
312: flange,
315: thermally insulating section,
317: upstream-side projection,
318: downstream-side projection,
320: terminal connection section,
322: protection section,
324: ejector pin,
326: insertion hole,
328: positioning section,
331: bonding section of cover,
341: downstream section,
342: upstream section,
343: entrance,
347: acute inclination section,
350: entrance,
351: entrance groove,
352: exit,
353: exit groove,
356: protrusion section,
361: inner end of external terminal,
380: protrusion section,
381: protrusion section,
382: cavity section,
386: passage on front side,
387: passage on rear side,
390: welded section of circuit chamber section,
391: welded section of auxiliary channel section,
392: irregularities formation section of housing,
400: circuit package,
412: connection terminal,
430: passage surface for measurement, 431: rear side surface of passage surface for measurement,
436: heat transmission surface exposure section,
438: opening,
452: temperature detection section,
500: laser beam, and
602: flow rate detection section.

The invention claimed is:

1. A flow sensor comprising:
a housing to receive an auxiliary channel having an opening through which a fluid to be measured is taken in;
a flow rate detection section disposed within the auxiliary channel to measure a flow rate of the fluid to be measured;
electronic parts isolated from the auxiliary channel to drive the flow rate detection section within a circuit chamber; and
a resinous cover bonded to the housing to air-tightly seal the circuit chamber from a surrounding atmosphere, wherein
the flow rate detection section provided on a tip end of a circuit package is protruded into the auxiliary channel so as to be received in the flow sensor;
a first protrusion and a bonding section formed on an inner surface of the cover are laser welded to each other;
the first protrusion is formed on the housing to constitute the auxiliary channel;
second and third protrusions that are formed on each end of the bonding section of the cover; and
a height of the second protrusion is at most a half of a height of the third protrusion.

2. The flow sensor according to claim 1, wherein a width of the bonding section formed on the cover is formed larger by a width over which burrs of a fused resin are formed than an upper surface width of the first protrusion.

3. The flow sensor according to claim 1, wherein an incident laser beam spot diameter is larger than the upper surface width of the first protrusion.

4. The flow sensor according to claim 1, wherein an inclination is provided on a side surface of at least a part of the first protrusion.

5. The flow sensor according to claim 4, wherein-aft the inclination angle of the first protrusion is made larger than an inclination angle of the second and third protrusions.

6. The flow sensor according to claim 4, wherein the inclination angle of the first protrusion is made smaller than the inclination angle of the second and third protrusions.

7. The flow sensor according to claim 1, wherein minute irregularities are formed on a side surface of the first protrusion.

8. The flow sensor according to claim 1, wherein a percentage in content by which glass fibers are added to a thermoplastic resin from which the cover is made is smaller than a percentage in content by which glass fibers are added to a thermoplastic material from which the housing is made.

9. The flow sensor according to claim 1, wherein a crystallization of the thermoplastic resin from which the housing is made is larger than that of the thermoplastic resin from which the cover is made.

10. The flow sensor according to claim 1, wherein an elastic modulus of the thermoplastic resin from which the housing is made is larger than that of the thermoplastic resin from which the cover is made.

11. A manufacturing method of a flow sensor comprises:
forming a first protrusion section to seal a circuit chamber through a resinous cover and a second protrusion section for connection to constitute an auxiliary channel with the resinous cover therebetween in a housing in which an auxiliary channel groove provided with an opening through which a fluid to be measured is taken in is formed and which receives a flow rate detection section disposed within the auxiliary channel to measure a flow rate of the fluid to be measured and electronic parts isolated from the auxiliary channel to drive the flow rate detection section in the circuit chamber;
forming on the resinous cover bonding sections to be bonded to the first and second protrusion sections formed on the housing as well as forming a third protrusion section on each end of the bonding section to be bonded to the second protrusion section, wherein the third protrusion section is formed such that a height of a protrusion formed on a side of the auxiliary channel is at most a half of a height of a protrusion formed on an opposite side to the auxiliary channel;
overlapping the housing in which the respective electronic parts are received and the cover over one another with aligned in position;
applying pressure to the overlapped housing and cover; and
irradiating a laser beam onto the cover so as to firstly make an interval between the first protrusion section and the corresponding bonding section laser-welded and then to make an interval between the second protrusion section and the corresponding bonding section laser-welded, thereby the cover being bonded to the housing.

12. The manufacturing method of a flow sensor according to claim 11, further comprising the steps of overlapping the housing in which the respective electronic parts are received and the cover over one another with aligned in position; pressure is applied to the overlapped housing and cover; irradiating a laser beam onto the cover so as to firstly make an interval between the second protrusion section and the corresponding bonding section laser-welded and then to make an interval between the first protrusion section and the corresponding bonding section laser-welded, thereby the cover being bonded to the housing.

* * * * *